United States Patent
Yang et al.

(10) Patent No.: US 11,390,801 B2
(45) Date of Patent: Jul. 19, 2022

(54) METHOD FOR PREPARING BRIGHT NEAR-INFRARED EMISSIVE CARBON DOTS WITH BOTH ULTRA-NARROW FULL WIDTH AT HALF MAXIMUM AND WITH TWO-PHOTON FLUORESCENCE

(71) Applicant: Jilin University, Jilin (CN)

(72) Inventors: Bai Yang, Jilin (CN); Junjun Liu, Jilin (CN); Kai Zhang, Jilin (CN); Yunfeng Li, Jilin (CN)

(73) Assignee: Jilin University, Jilin (CN)

( * ) Notice: Subject to any disclaimer, the term of this patent is extended or adjusted under 35 U.S.C. 154(b) by 22 days.

(21) Appl. No.: 17/039,074

(22) Filed: Sep. 30, 2020

(65) Prior Publication Data
US 2021/0122973 A1    Apr. 29, 2021

(30) Foreign Application Priority Data
Oct. 24, 2019    (CN) .......................... 201911015754.3

(51) Int. Cl.
| | | |
|---|---|---|
| *C09K 11/65* | (2006.01) | |
| *C01B 32/15* | (2017.01) | |
| *B82Y 20/00* | (2011.01) | |
| *B82Y 40/00* | (2011.01) | |

(52) U.S. Cl.
CPC ............. *C09K 11/65* (2013.01); *C01B 32/15* (2017.08); *B82Y 20/00* (2013.01); *B82Y 40/00* (2013.01); *C01P 2004/04* (2013.01); *C01P 2004/64* (2013.01)

(58) Field of Classification Search
CPC . C01B 32/182; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01B 32/15; C09K 11/65; B82Y 20/00; B82Y 40/00; B82Y 30/00; C01P 2004/04; C01P 2004/64

See application file for complete search history.

(56) References Cited

PUBLICATIONS

Liu, et al., Deep Red Emissive Carbonized Polymer Dots with Unprecedented Narrow Full Width at Half Maximum, Adv. Mater. 2020; 32: 1906641, pp. 1-9, with Supporting Information (SI), published online Mar. 19, 2020 (Year: 2020).*

Yuan, et al., Engineering triangular carbon quantum dots with unprecedented narrow bandwidth emission for multicolored LEDs, Nautre Communications 2018; 9: 1-11 (Year: 2018).*

* cited by examiner

*Primary Examiner* — Daniel C. McCracken
(74) *Attorney, Agent, or Firm* — Cesari & McKenna, LLP

(57) ABSTRACT

Bright near-infrared emissive carbon dots with both ultra-narrow full width at half maximum and with two-photon fluorescence and a preparation method thereof are provided. Green leaves are used as carbon source to prepare near-infrared emissive carbon dots by one-step solvothermal method. The resulting mixture is centrifuge, filtered and dried to remove the solvent, to obtain a near-infrared carbon dots solid.

9 Claims, 4 Drawing Sheets

METHOD FOR PREPARING BRIGHT NEAR-INFRARED EMISSIVE CARBON DOTS WITH BOTH ULTRA-NARROW FULL WIDTH AT HALF MAXIMUM AND WITH TWO-PHOTON FLUORESCENCE

CROSS REFERENCE TO RELATED APPLICATIONS

The application claims priority to Chinese Application No. 201911015754.3, filed on Oct. 24, 2019, entitled "Method for preparing bright near-infrared emissive carbon dots with both ultra-narrow full width at half maximum and with two-photo fluorescence," which is hereby incorporated by reference in its entirety.

TECHNICAL FIELD

The present disclosure relates to a technical field of material science, and particularly to a method for preparing bright near-infrared emissive carbon dots with both ultra-narrow full width at half maximum and with two-photon fluorescence.

BACKGROUND

In recent years, carbon dots (CDs) have been widely used in photoelectric devices, biomedicine and other fields due to their high absolute quantum yield, low toxicity, green and environmentally friendly preparation methods and good stability. At present, most reported CDs emit blue and/or green fluorescence. Near-infrared fluorescence (650-1000 nm) is increasingly preferred due to the advantages of low background light interference, strong tissue penetration, and low damage to organisms.

In addition, the emission with narrow full width at half maximum is of great significance in enhancing the contrast of fluorescence imaging, improving the color purity of display devices, and serving as laser emitting material. At present, many reported near-infrared fluorescent materials with high efficiency and narrow emission (full width at half maximum<30 nm) are semiconductor quantum dots and perovskite quantum dots, but they all have the drawbacks of high toxicity, complicated preparation process and environmental pollution. Therefore, the synthesis of bright and narrow near-infrared emissive carbon dots through a green, environmentally friendly and simple preparation process will promote the practical application of carbon dots in bioimaging and photoelectric devices.

SUMMARY

In view of the drawbacks of the prior art, an object of embodiments of the present disclosure is to provide bright near-infrared emissive carbon dots with both ultra-narrow full width at half maximum (FWHM) and with two-photon fluorescence, exhibiting good biocompatibility, prepared from green leaves, and a preparation method thereof.

For bright near-infrared emissive carbon dots with both ultra-narrow full width at half maximum and with two-photon fluorescence according to the present disclosure, they behave fluorescence emission in a range of 650-800 nm, and possess an absolute quantum yield of more than 40% under the optimal excitation wavelength of 413 nm, and an absolute quantum yield of more than 25% under the near-infrared excitation. Herein, the absolute quantum yield is measured on FLS 920 with an integrating sphere (Edinburgh). And the FLS 920 instrument in Jilin University bought from Edinburgh has been recognized by China Metrology Accreditation.

In some embodiments, the carbon dots exhibit the particle size range of 1-10 nm and obvious lattices, as well as a height from 1 to 20 nm; the carbon dots with optimal emissive peaks at about 673 nm and 720 nm, show the full width at half maximum of about 20 nm and excitation-independent fluorescence. Herein, the particle size of the carbon dots is defined as the maximum linear distance between two points on the carbon dots, and is determined by statistic results from the transmission electron microscopy (TEM) images. TEM images are recorded on JEM-2100F. The height of the carbon dots is determined by atomic force microscopy (AFM) images. AFM images are recorded in the tapping mode with a Nanoscope IIIa scanning probe microscope from Digital Instruments under ambient conditions.

A method for preparing bright near-infrared emissive carbon dots with both ultra-narrow full width at half maximum and with two-photon fluorescence, comprises the following steps:

(1) choosing a dry green leaf as raw material, crushing to a powder, and mixing the powder with an organic solvent;

(2) placing the reaction liquid mixture obtained in step (1) to a stainless steel reactor, and heating to react in a sealed reactor;

(3) centrifuging the solution after reaction obtained in step (2), collecting a supernatant, and filtering the supernatant through a filter head with 0.22 μm organic phase to remove large-size particles, to obtain a near-infrared carbon dots solution; and (4) placing the near-infrared carbon dots solution obtained in step (3) in an oven and drying to remove the organic solvent, to obtain a near-infrared carbon dots solid.

In some embodiments, the organic solvent in step (1) is at least one selected from the group consisting of acetone (analytical reagent, AR, produced by Beijing Chemical Industry), anhydrous ethanol (produced by Beijing Chemical Industry), methanol (AR, produced by Beijing Chemical Industry), a silane coupling agent solvent, etc. The silane coupling agent solvent may be for example tetraethyl silicate (98%, produced by Aladdin), tetramethoxysilane (98%, produced by Aladdin), 3-aminopropyltriethoxysilane (98%, produced by Bailingwei Technology), and so on.

In some embodiments, in step (1), a mass/volume ratio of the powder to the organic solvent is 1 g:10-40 mL.

In some embodiments, in step (2), the reaction is carried out at a temperature of 100-250° C. for 2-10 h; the sealed reactor is selected from the group consisting of an oven, a Muffle furnace and a high pressure microwave reactor, etc.

In some embodiments, in step (3), the centrifugation is carried out at a rate of 5000-10000 r/min for 5-10 min.

In some embodiments, the drying is carried out at a temperature of 50-90° C.

Some embodiments of the present disclosure has the following good effects:

(1) The present disclosure uses green leaves as carbon source to prepare near-infrared emissive carbon dots by one-step solvothermal method. For the near-infrared emissive carbon dots prepared by the present disclosure, their fluorescence emission wavelength does not vary with the excitation wavelength, and they have the current highest absolute quantum yield of 44% under 413 nm excitation, an absolute quantum yield of 29% under the near-infrared excitation, which is the current highest value of near-infrared carbon dots under the excitation in the near red window, and a full width at half maximum of about 20 nm, which is the minimum value ever reported, and they exhibit two-photon fluorescence properties. Thus, they have important application value in photoelectric displays and biomedicine.

(2) The method for preparing near-infrared emissive carbon dots according to the present disclosure has the advantages of a simple and fast process, rich carbon source, green and environmentally friendly, and low cost, etc. It does not require subsequent modifications, does not require expensive and complicated equipment, and is easy to realize industrialized production.

BRIEF DESCRIPTION OF THE DRAWINGS

In order to explain the technical solutions in the embodiments of the present disclosure or the technical solutions in the prior art more clearly, the drawings that need to be used in the description of the embodiments or the prior art is briefly introduced below. Obviously, the drawings in the following description are only some embodiments recited in the present disclosure. For those ordinary skilled in the art, other drawings could be obtained based on these drawings without creative labor.

DETAILED DESCRIPTION OF THE EMBODIMENTS

The present disclosure will be further described below in reference with examples. Obviously, the described examples are only a part of the examples of the present disclosure, rather than all the examples. The examples are intended to explain the present disclosure in detail, but not to limit the present disclosure. Based on the examples of the present disclosure, all other examples obtained by those ordinary skilled in the art without creative labor shall fall within the protection scope of the present disclosure.

Example 1

1. Preparation of near infrared carbon dots:

Green taxus leaves were used as carbon source, and 1 g of dry taxus leaves were weighed, crushed to a powder, and placed in a 30 mL teflon-lined stainless steel reactor. Then 20 mL of acetone solvent (AR, produced by Beijing Chemical Industry) was added. The reactor was sealed by tightening the lid of the reactor, then placed in an oven that had been heated to 120° C., and thermally insulated for 5 h before taken out. Then the reactor was naturally cooled to room temperature. The resulting mixture was taken out of the reactor and centrifuged at a rate of 8000 r/min. The supernatant was collected and filtered through a filter head with 0.22 µm organic phase to remove large-size particles, to obtain a near-infrared carbon dots solution. The target near-infrared emissive carbon dots solution was dried in an oven at 60° C. to remove the solvent, obtaining a near-infrared carbon dots solid.

Figure 1:
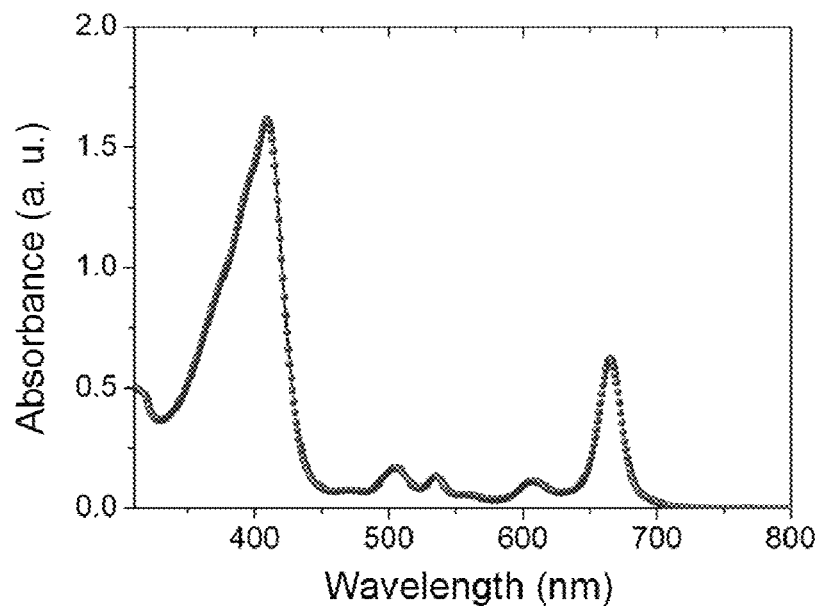
FIG. 1 shows the absorption spectrum graph of the near-infrared carbon dots as prepared in Example 1.
Figure 2:
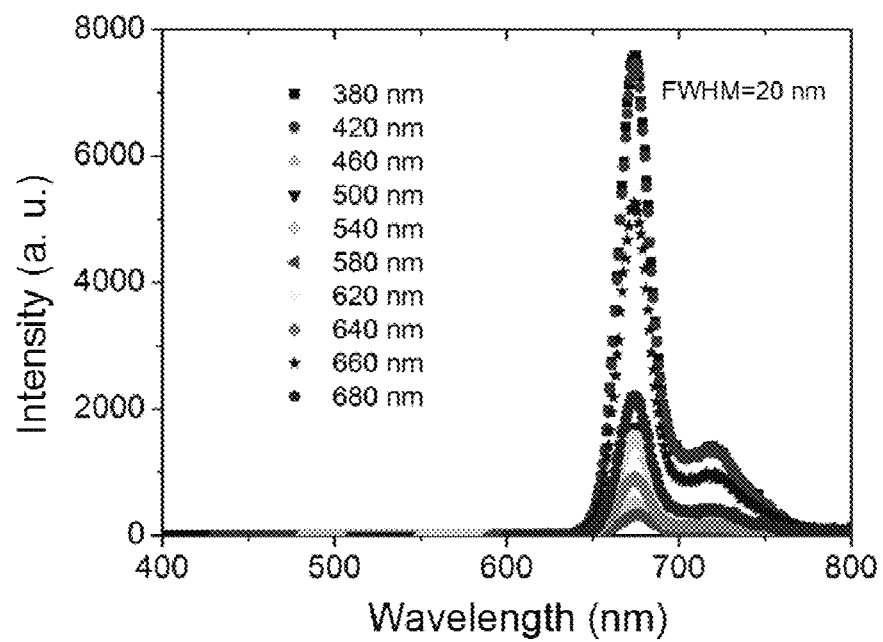
FIG. 2 shows the fluorescence spectra graph of the near-infrared carbon dots as prepared in Example 1.
Figure 3:
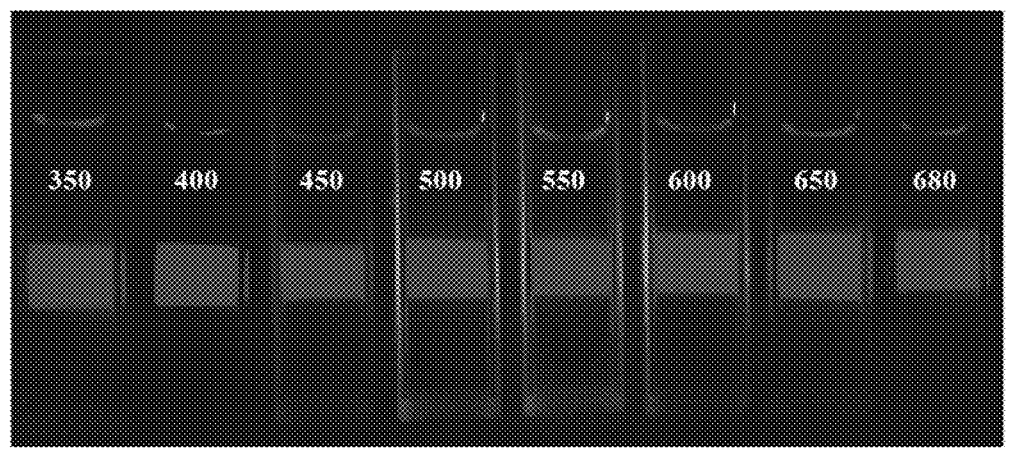
FIG. 3 shows optical photos of the near-infrared carbon dots as prepared in Example 1 under different excitation lights.

2. The properties, morphology and structure characterizations of the near-infrared carbon dots were as follows:

The optical properties of the prepared solution of carbon dots in acetone were characterized, and the result was shown in FIG. 1: the carbon dots solution had very broad absorption ranging from UV to near-infrared light region. The results in FIG. 2 showed that the carbon dots solution had a fluorescence emission with a narrower full width at half maximum (about 20 nm), and the fluorescence emission peaks did not vary with the excitation wavelength, and particularly, the fluorescence excited by a light with a wavelength of 360-680 nm was in a range of 650-800 nm, within the near-infrared region, with optimal emission peaks at around 673 nm and 720 nm. The results in FIG. 3 showed that the solution of the carbon dots in acetone according to the present disclosure could emit bright near-red fluorescence under the excitation wavelength of 350 nm, 450 nm, 500 nm, 550 nm, 600 nm, 650 nm and 680 nm.

Figure 4:
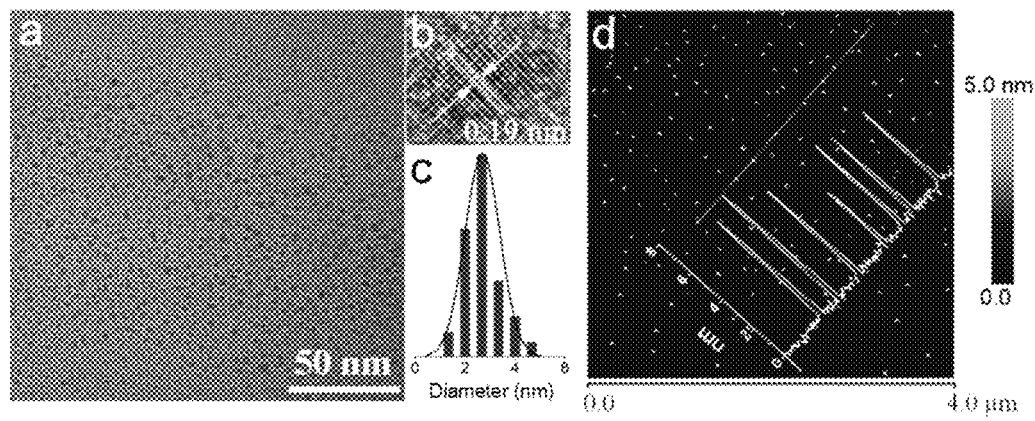
FIG. 4 shows the morphological characterization of the near-infrared carbon dots as prepared in Example 1, in which (a), (b), and (c) each show the transmission electron microscopy image, the high-resolution transmission electron image, and the statistical distribution diagram of particle size obtained by counting 300 carbon dots, and (d) shows the atomic force microscope image and the height profile of the carbon dots along the diagonal line.

The morphology of the prepared near-infrared carbon dots was characterized by transmission electron microscope, high-resolution transmission electron microscope and atomic force microscope tests, and the results showed that the target product obtained in this example was carbon dots (as shown in FIG. 4), with a particle size of 1-10 nm, an average height of 5 nm, and they exhibit obvious lattices.

Figure 5:
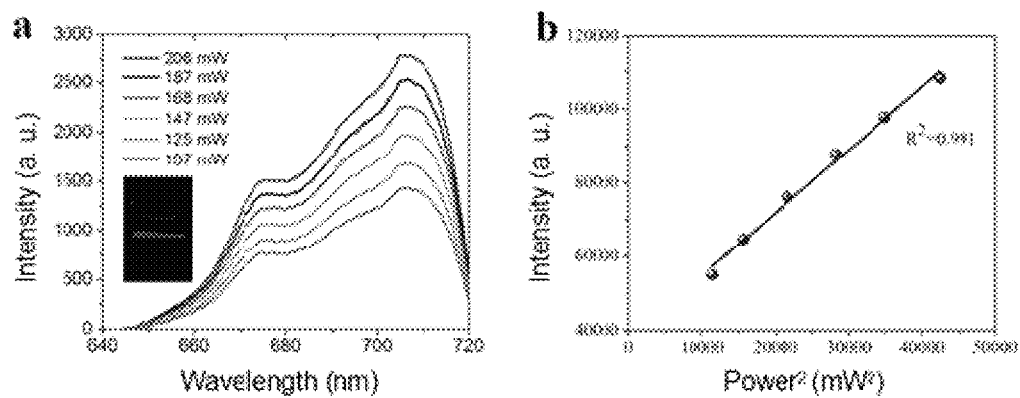
FIG. 5 shows characterization of the two-photon fluorescent properties of the near-infrared carbon dots as prepared in Example 1, in which (a) shows the two-photon fluorescence spectra graph, in which the inset is an optical photo under 750 nm laser excitation, and (b) shows a linear relationship curve between the fluorescence intensity and the square of the excitation power.

The two-photon fluorescence properties of the prepared near-infrared carbon dots were characterized. As shown in FIG. 5, the carbon dots of the present disclosure not only have good fluorescence performance under one-photon excitation, but also have a good fluorescence performance under 750 nm near-infrared two-photon excitation. The fluorescence intensity emitted by the carbon dots solution gradually increased as the power of the excitation light source increased, and there was a linear relationship between fluorescence intensity and the square of the excitation power, indicating that the carbon dots had good two-photon absorption characteristics.

Figure 6:
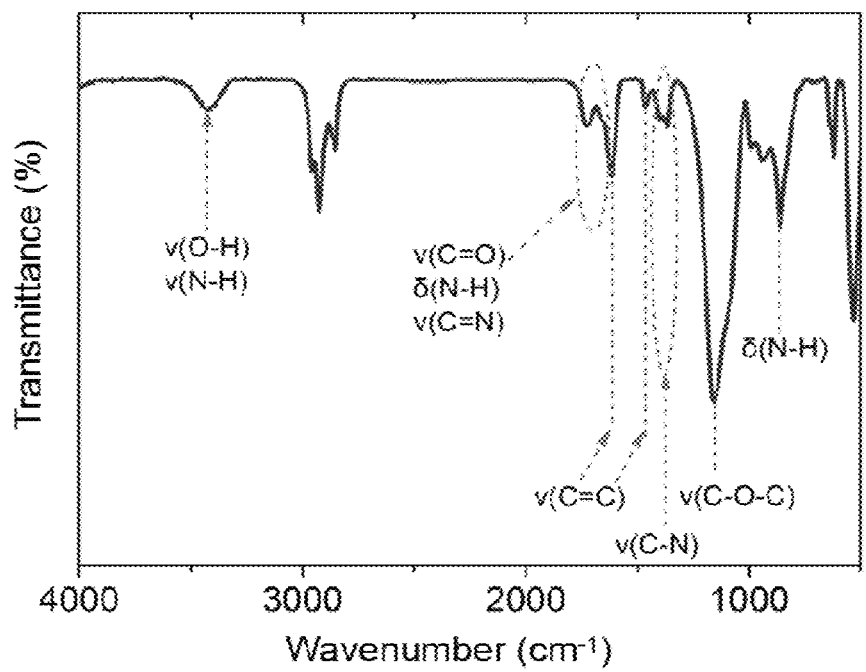
FIG. 6 shows the structure characterization diagram of the near-infrared carbon dots as prepared in Example 1.

The structure of the prepared near-infrared carbon dots was characterized, and the infrared spectrum graph was shown in FIG. 6. The structure of carbon dots according to the present disclosure mainly contains chemical bonds such as amino, hydroxyl, aromatic ring, nitrogen heterocycle, ether bond, etc.

Example 2

Green taxus leaves were used as carbon source, and 1 g of dry taxus leaves were weighed, crushed to a powder, and placed in a 30 mL teflon-lined stainless steel reactor. Then 20 mL of tetraethyl silicate (98%, produced by Aladdin) was added. The reactor was sealed by tightening the lid of the reactor, then placed in an oven that had been heated to 120° C., and thermally insulated for 5 h before taken out. Then the reactor was naturally cooled to room temperature. The resulting mixture was taken out of the reactor and centrifuged at a rate of 8000 r/min. The supernatant was collected and filtered through a filter head with 0.22 μm organic phase to remove large-size particles, to obtain a near-infrared emissive carbon dots solution. The target near-infrared carbon dots solution was dried in an oven at 60° C. to remove the solvent, obtaining a near-infrared carbon dots solid.

Figure 7:
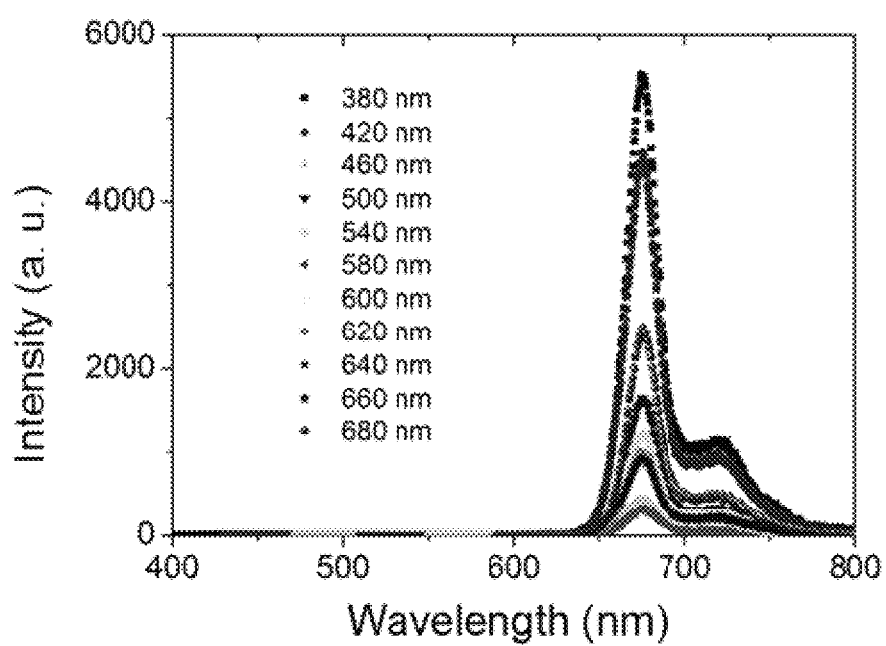
FIG. 7 shows the fluorescence spectra graph of the near-infrared carbon dots as prepared in Example 2.

The fluorescence spectrum graph of the carbon dots obtained in this example was shown in FIG. 7. The full width at half maximum of the fluorescence emission peaks was narrower (about 23 nm), and the fluorescence emission peaks did not vary with the excitation wavelength. The fluorescence emission peaks were mainly in a range of 650-800 nm, within the near-infrared region.

Example 3

Green taxus leaves were used as carbon source, and 1 g of dry taxus leaves were weighed, crushed to a powder, and placed in a 30 mL teflon-lined stainless steel reactor. Then 20 mL of tetramethoxy silane (98%, produced by Aladdin) was added. The reactor was sealed by tightening the lid of the reactor, then placed in an oven that had been heated to 120° C., and thermally insulated for 5 h before taken out. Then the reactor was naturally cooled to room temperature. The resulting mixture was taken out of the reactor and centrifuged at a rate of 8000 r/min. The supernatant was collected and filtered through a filter head with 0.22 μm organic phase to remove large-size particles, to obtain a near-infrared emissive carbon dots solution. The target near-infrared carbon dots solution was dried in an oven at 60° C. to remove the solvent, obtaining a near-infrared carbon dots solid.

Figure 8:
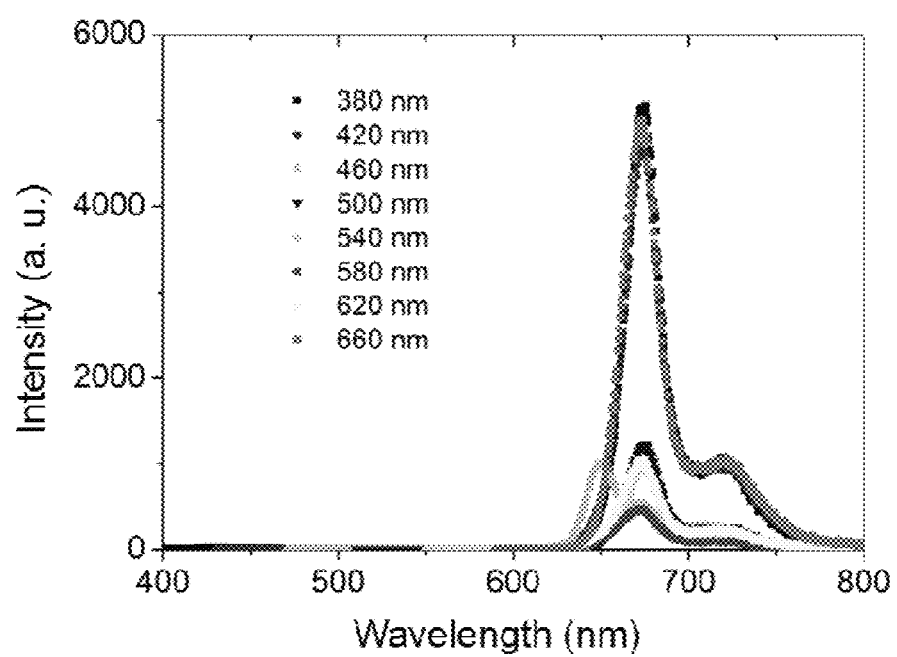
FIG. 8 shows the fluorescence spectra graph of the near-infrared carbon dots as prepared in Example 3.

The fluorescence spectrum graph of the carbon dots obtained in this example was shown in FIG. 8. The full width at half maximum of the fluorescence emission peaks was narrower (about 23 nm), and the fluorescence emission peaks did not vary with the excitation wavelength. The fluorescence emission peaks were mainly in a range of 650-800 nm, within the near-infrared region.

The above are only specific embodiments of the present disclosure. It should be pointed out that for those ordinary skilled in the art, without departing from the principle of the present disclosure, several improvements and modifications can be made, and these improvements and modifications also should be regarded as the protection scope of the present disclosure.

The invention claimed is:

1. A method for preparing near-infrared emissive carbon dots with two-photon fluorescence, the method comprising the steps of:
   (1) choosing a dry green leaf as raw material, crushing to a powder, and mixing the powder with an organic solvent;
   (2) transferring the reaction liquid mixture obtained in step (1) to a stainless steel reactor, and heating to react in a sealed reactor;
   (3) centrifuging the solution obtained in step (2), collecting a supernatant, and filtering the supernatant through a filter head with 0.22 μm organic phase to remove large-size particles, to obtain a near-infrared carbon dots solution; and
   (4) placing the near-infrared carbon dots solution obtained in step (3) in an oven and drying to remove the organic solvent, to obtain a solid of the near-infrared carbon dots.

2. The method of claim 1, wherein the organic solvent in step (1) is at least one selected from the group consisting of acetone, anhydrous ethanol, methanol, tetraethyl silicate, tetramethoxysilane and 3-aminopropyltriethoxysilane.

3. The method of claim 1, wherein in step (1), a mass/volume ratio of the powder to the organic solvent is 1 g:10-40 mL.

4. The method of claim 1, wherein the sealed reactor in step (2) is selected from the group consisting of an oven, a Muffle furnace, and a high pressure microwave reactor.

5. The method of claim 1, wherein in step (2), the reaction is carried out at a temperature of 100-250° C. for 2-10 h, to obtain a near-infrared carbon dots solution.

6. The method of claim 1, wherein in step (3), the centrifuging is carried out at a rate of 5000-10000 r/min for 5-10 min.

7. The method of claim 1, wherein in step (4), the drying is carried out at a temperature of 50-90° C.

8. The method of claim 1, wherein in step (3), the near-infrared carbon dots solution have a fluorescence emission in a range of 650-800 nm, with a full width at half maximum of 20 nm, and exhibit two-photon fluorescence.

9. Near-infrared emissive carbon dots with two-photon fluorescence prepared by the method of claim 1, wherein the near-infrared emissive carbon dots have a fluorescence emission in a range of 650-800 nm, with a full width at half maximum of 20 nm.

* * * * *